United States Patent
Boyd et al.

(10) Patent No.: US 7,455,485 B2
(45) Date of Patent: Nov. 25, 2008

(54) CUTOUT BIT FOR USE WITH ROTARY TOOL

(75) Inventors: Wayne Boyd, Greenville, NC (US);
William Palmer, Greenville, NC (US);
David Noggle, Park Ridge, IL (US);
Garth Prince, Chicago, IL (US)

(73) Assignee: Robert Bosch GmbH, Stuttgart (DE)

( * ) Notice: Subject to any disclaimer, the term of this patent is extended or adjusted under 35 U.S.C. 154(b) by 467 days.

(21) Appl. No.: 11/217,201

(22) Filed: Aug. 31, 2005

(65) Prior Publication Data

US 2007/0048100 A1    Mar. 1, 2007

(51) Int. Cl.
B23B 51/08    (2006.01)
(52) U.S. Cl. .............................. 408/26; 407/53; 408/230
(58) Field of Classification Search .................. 408/22, 408/24, 26, 30, 118, 224, 227, 230; 407/53, 407/54; B23B 51/08
See application file for complete search history.

(56) References Cited

U.S. PATENT DOCUMENTS

| | | | |
|---|---|---|---|
| 877,831 A * | 1/1908 | Creedon ..................... 408/214 |
| 2,623,552 A | 12/1952 | Compton et al. |
| 2,912,887 A * | 11/1959 | Andreasson ................. 408/57 |
| 3,003,224 A | 10/1961 | Ribich |
| 3,040,605 A * | 6/1962 | Andreasson ................. 408/59 |
| 3,058,199 A | 10/1962 | Cave et al. |
| 3,064,699 A * | 11/1962 | Gleason ..................... 408/212 |
| 3,073,189 A | 1/1963 | Paige |
| 3,913,196 A | 10/1975 | Maday |
| 4,274,771 A | 6/1981 | Nishimura |
| 4,330,229 A * | 5/1982 | Croydon ..................... 408/212 |
| 4,395,167 A | 7/1983 | Maternus |
| 4,602,900 A * | 7/1986 | Arpaio et al. ............... 408/230 |
| 5,143,490 A | 9/1992 | Kopras |
| 5,380,133 A | 1/1995 | Schimmer |
| 5,947,659 A | 9/1999 | Mays |
| 6,234,725 B1 | 5/2001 | Campian |
| 6,527,065 B1 | 3/2003 | Tibbits et al. |
| 6,637,987 B2 * | 10/2003 | Lui et al. ..................... 408/26 |
| 6,758,639 B2 * | 7/2004 | Risen, Jr. ..................... 408/199 |

FOREIGN PATENT DOCUMENTS

| | | |
|---|---|---|
| DE | 36 28 262 | 1/1988 |
| GB | 2217241 A * | 10/1989 |
| JP | 2001009614 A * | 1/2001 |

* cited by examiner

*Primary Examiner*—Daniel W Howell
(74) *Attorney, Agent, or Firm*—Maginot, Moore & Beck

(57) ABSTRACT

The cutout bit includes a first bit segment configured to be free of flutes. The cutout bit also includes a second bit segment extending from the first bit segment at a first location. Moreover, the cutout bit includes a third bit segment extending from the second bit segment and terminating in a tip. In addition, the cutout bit includes a first flute extending along only the second bit segment. The cutout bit also includes a second flute extending along both the second bit segment and the third bit segment. The second flute extends from the first location to the tip.

10 Claims, 7 Drawing Sheets

CUTOUT BIT FOR USE WITH ROTARY TOOL

BACKGROUND

This invention relates to the field of cutout bits for use with rotary tools. During a construction project it may be desirable to create large wall areas with drywall. To efficiently perform this task, large drywall panels are initially secured to wood studs and/or other supporting structure thereby covering planned openings in the large wall areas such as those for electrical outlet boxes and window and door frames. Thereafter, openings are cut in the large drywall panels to expose the electrical outlet boxes, window and door frames, and/or other underlying structures. The underlying structures typically provide templates or guides for cutting the corresponding openings in the drywall. Indeed, a drywall cutting tool is lightly urged against the peripheries of the underlying structures while maneuvering the cutting tool therearound to create the openings. This results in time savings when compared to creating such openings in the large drywall panels prior to securing the drywall to the support structure.

A conventional twist drill bit typically will not move smoothly around the periphery of an underlying structure; if guided against the structure it will typically abrade or cut into the structure, thereby undesirably dulling itself and marring the underlying structure. Additionally, a conventional twist drill bit may perform well in the axial direction, but typically performs inadequately when moved in the lateral direction since its flute configuration is configured primarily for drilling in the axial direction.

Consequently, special tools have been developed for cutting openings in drywall and performing similar operations on wood and/or other materials. Such tools are generally used as bits in routers. These bits typically must cut axially through a workpiece and then laterally (i.e., in directions perpendicular to their lengths) through the workpiece to make the desired openings. To this end, such a bit has historically included a shank for insertion into a router, a tip portion with one or more axial cutting features, a smooth non-fluted guide portion at the proximal end of the tip portion for guiding the bit against an underlying structure, and possibly more lateral cutting features extending between the guide portion and the shank. While omissions of axial drilling features from the guide portions of some such bits may have facilitated tracing the bits around underlying structures, the lack of axial drilling features has also undesirably limited drilling efficiencies of the bits.

Thus, there is a need for a cutout bit that provides improved axial drilling features in a guide portion of the bit that can nevertheless trace smoothly around underlying structures.

SUMMARY

In accordance with one embodiment of the present invention, there is provided a cutout bit that includes a first bit segment configured to be received in a chuck of a rotary power tool, the first bit segment being free of flutes. The cutout bit also includes a second bit segment having defined therein a plurality of flutes that extend helically along the second bit segment. In addition, the cutout bit includes a third bit segment having only a single flute defined therein, the single flute (i) extending helically along the third bit segment, and (ii) being aligned with one of the plurality of flutes defined in the second bit segment.

In accordance with another embodiment of the present invention, there is provided a cutout bit that includes a first bit segment configured to be free of flutes. The cutout bit also includes a second bit segment extending from the first bit segment at a first location. In addition, the cutout bit includes a third bit segment extending from the second bit segment and terminating in a tip. The cutout bit additionally includes a first flute extending along only the second bit segment, as well as a second flute extending along both the second bit segment and the third bit segment. The second flute extends from the first location to the tip.

In accordance with yet another embodiment of the present invention, there is provided a cutout bit having a first bit segment configured to be received in a chuck of a rotary power tool. The cutout bit further includes a second bit segment having a first flute portion that extends helically along the second bit segment. Moreover, the cutout bit includes a third bit segment having a second flute portion that extends helically along the third bit segment. When the cutout bit is viewed in a cross sectional view at the third bit segment, (i) the cutout bit defines a circular shaped bit periphery, and (ii) the second flute portion defines a curve extending from a first flute end to a second flute end. Also, the first flute end and the second flute end both lie on the bit periphery. Moreover, when the curve is plotted on an X-Y graph in which a straight line extending between the first flute end and the second flute end defines an X-axis of the X-Y graph, the curve possesses both (i) a local maximum that is interposed between the first flute end and the second flute end, and (ii) a local minimum that is interposed between the first flute end and the second flute end.

DESCRIPTION

Figure 1:
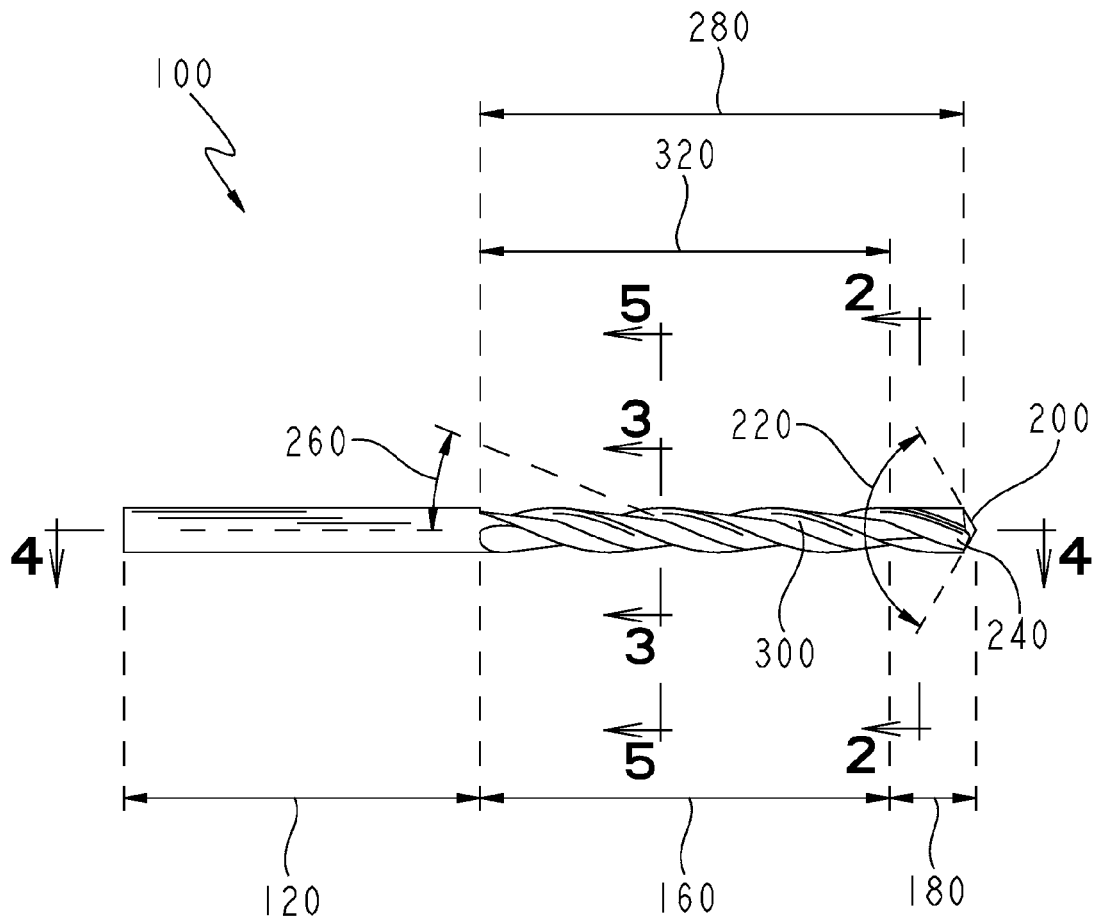
FIG. 1 is a side plan view of an exemplary cutout bit according to the present invention.

Like reference numerals indicate like parts and/or features throughout the description and the drawings.

FIG. 1 is a side plan view of an exemplary cutout bit 100 according to the present invention. In the exemplary embodiment, bit 100 is machined from grade M50 molybdenum high speed steel and then heat treated (triple tempered as well known in the art) to 60-65 Rockwell C hardness. In alternative embodiments, bit 100 may be made from any other suitable material(s) and/or process(es).

Bit 100 includes a shank 120. Shank 120 is configured to, among other things, be grasped by a chuck 140 (see FIG. 6 and FIG. 7). In the exemplary embodiment, shank 120 is generally cylindrical. In alternative embodiments, shank 120 may be implemented in whole or in part as a hexagonal prism, a rectangular prism, any other suitable prismoid, and/or any other suitable shape, and shank 120 may include any other suitable fitting or coupling features.

Bit 100 further includes a multi-fluted radially sharp portion 160 extending axially from shank 120, and further includes a single-fluted radially dull portion 180 extending axially from portion 160. Portion 180 includes a single-fluted radially dull tip 200. Tip 200 is conical with an effective included angle 220 of about 160 degrees. Bit 100 further includes a right hand spiraling helical flute 240 extending from shank 120 through portion 160 and through portion 180 at a helix angle 260 of about 30 degrees. It is noted that flute 240 spirals all the way through tip 200. Flute 240 has an axial span 280.

Bit 100 further includes a right hand spiraling helical flute 300 extending from shank 120 through portion 160 coaxially to flute 240 at helix angle 260 such that flute 300 is double-helically disposed from flute 240. However, it is noted that flute 300 does not extend into or through portion 180 (and, thus, flute 300 also does not extend into or through tip 200). Flute 300 has an axial span 320 that is less than span 280.

Figure 2:
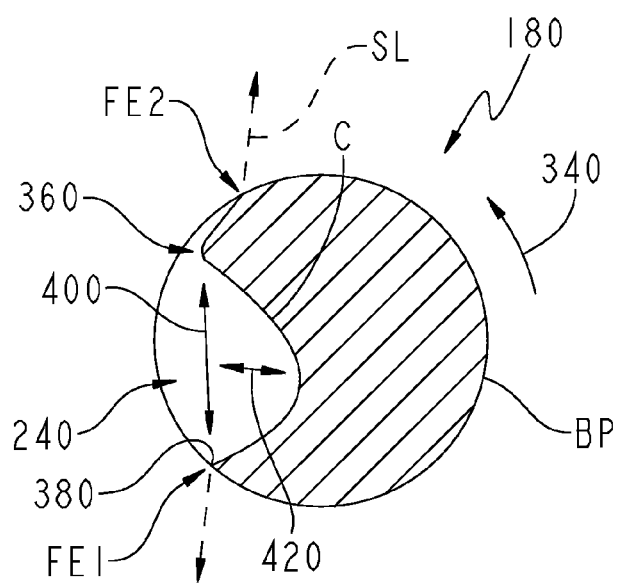
FIG. 2 is a cross-sectional view of the single-fluted radially dull portion of the exemplary bit of FIG. 1 (taken along line 2-2 of FIG. 1)

FIG. 2 is a cross-sectional view of portion 180 of exemplary bit 100 (taken along line 2-2 of FIG. 1). As at least partially discernable in FIG. 2, with reference to a rotational direction 340 flute 240 includes a leading edge 360 and a trailing edge 380. Edge 360 is ground down, somewhat flattened, or otherwise dulled or blunted throughout portion 180 such that it essentially acts as a "non-cutting" edge throughout portion 180 (i.e., it does not cut or abrade a workpiece significantly when portion 180 rotates in direction 340 and the portion 180 is urged against the workpiece). Additionally, edge 380 is configured to act as a non-cutting edge when portion 180 rotates in direction 340. Thus, portion 180 is "radially dull" (i.e., a non-cutting portion) when rotating in direction 340. Throughout portion 180 flute 240 has a width in the direction 400 and a depth in the direction 420.

Figure 3:
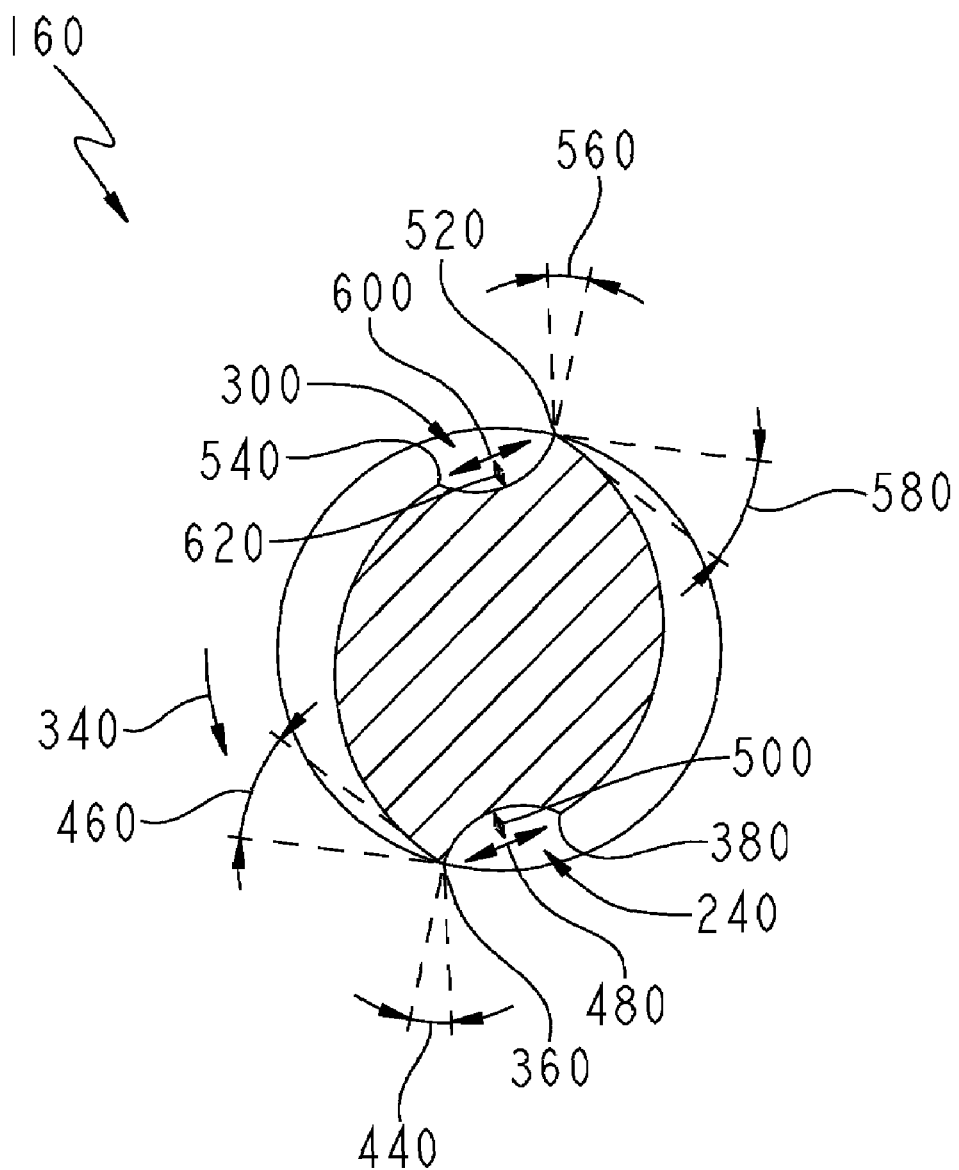
FIG. 3 is a cross-sectional view of the multi-fluted radially sharp portion of the exemplary bit of FIG. 1 (taken along line 3-3 of FIG. 1)

FIG. 3 is a cross-sectional view of portion 160 of exemplary bit 100 (taken along line 3-3 of FIG. 1). As at least partially discernable in FIG. 3, edge 360 is relatively sharp throughout portion 160 such that it essentially acts as a "cutting" edge throughout portion 160 (i.e., it cuts or abrades a workpiece significantly when portion 160 rotates in direction 340 and the portion 160 is urged against the workpiece). Thus, portion 160 is "radially sharp" (i.e., a cutting portion) when rotating in direction 340. Throughout portion 160, edge 360 extends from portion 160 at a positive rake angle 440 of about 15 degrees and a clearance angle 460 of about 35 degrees. Meanwhile, throughout portion 160 edge 380 is configured act as a non-cutting edge when portion 160 rotates in direction 340. Throughout portion 160 flute 240 has a width in the direction 480 and a depth in the direction 500. Width of flute 160 (in the direction 480) is less than the width of flute 180 (in the direction 400), and the depth of flute 160 (in the direction 500) is less than the depth of flute 180 (in the direction 420).

As also at least partially discernable in FIG. 3, with reference to direction 340 flute 300 includes an edge 520 and an edge 540. Edge 520 is relatively sharp throughout portion 160 (i.e., it essentially acts as a cutting edge throughout portion 160). Thus, portion 160 is additionally radially sharp relative to direction 340. Throughout portion 160, edge 520 extends at a positive rake angle 560 and a clearance angle 580. Throughout portion 160, edge 540 is configured act as a non-cutting edge when portion 160 rotates in direction 340. Throughout portion 160 flute 300 has a width in the direction 600 and a depth in the direction 620. Width of flute portion 160 (in the direction 600) is about equal to the width of the flute portion 160 (in the direction 480), and the depth of the flute portion 160 (in the direction 620) is about equal to the depth of the flute portion 160 (in the direction 500). Moreover, angle 560 is about equal to angle 440, and angle 580 is about equal to angle 460 such that flute 300 is generally symmetrical to flute 240 throughout portion 160.

Figure 4:
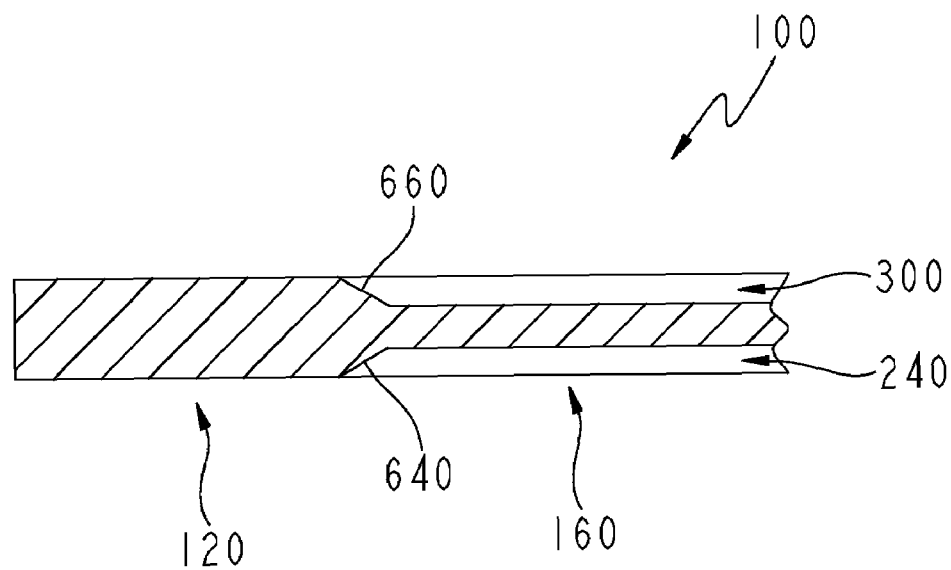
FIG. 4 is an untwisted cross-sectional depiction of the shank and the multi-fluted radially sharp portion of the exemplary bit of FIG. 1 (relative to line 4-4 of FIG. 1)
Figure 6:
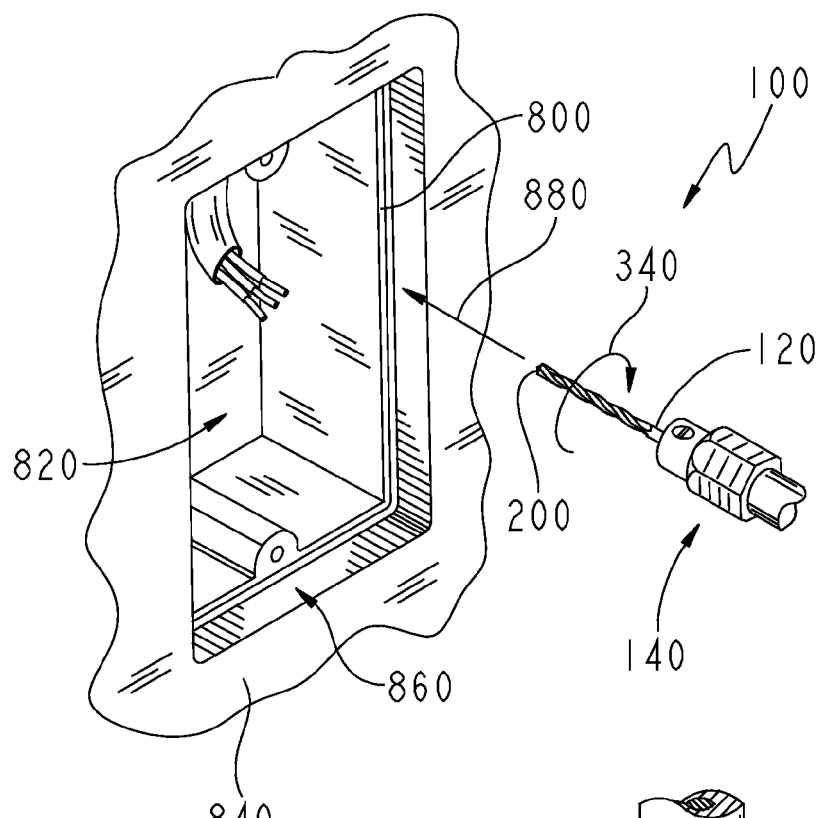
FIG. 6 is a perspective view of an exemplary operational alignment of the exemplary bit of FIG. 1.
Figure 7:
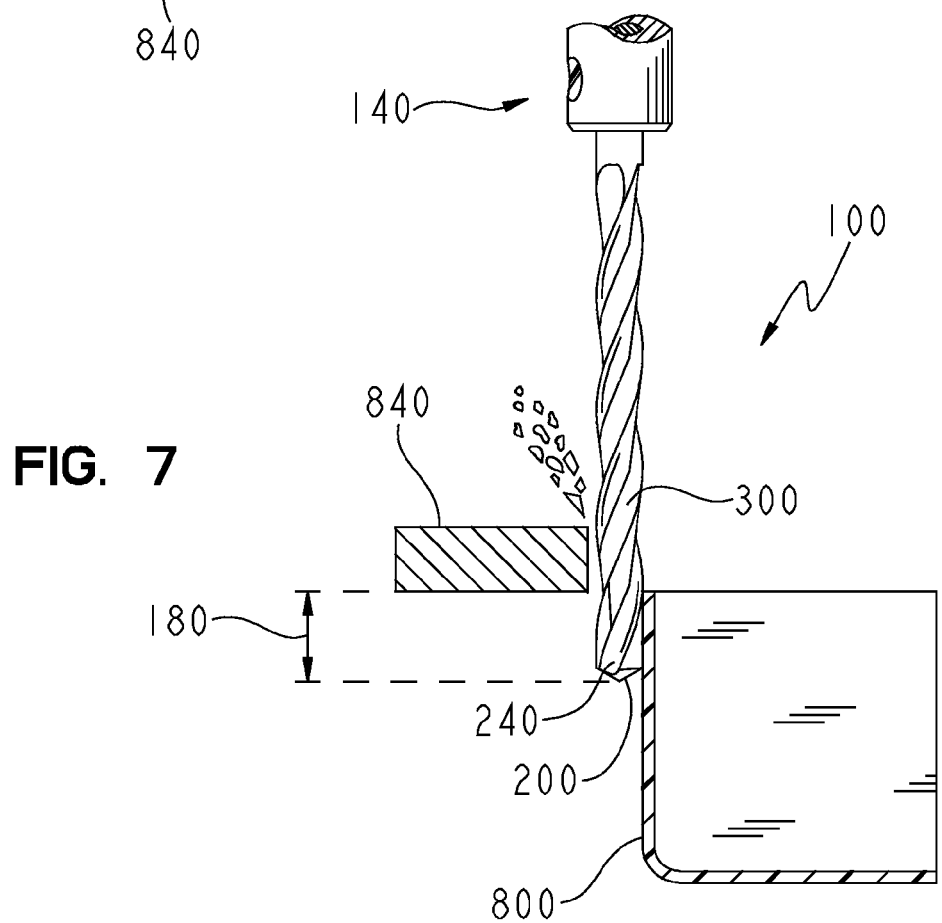
FIG. 7 is a side plan view of exemplary operations of the exemplary bit of FIG. 1.

FIG. 4 is an untwisted cross-sectional depiction of shank 120 and portion 160 of exemplary bit 100 (relative to line 4-4 of FIG. 1). It is noted that in FIG. 4 flute 240 and flute 300 are depicted as "untwisted" or straight merely for clarity of exposition. However, it should be appreciated that flute portions 240, 300 possess a helical configuration as shown in FIGS. 1, 6, and 7. As at least partially discernable in FIG. 4, at shank 120 flute 240 terminates or "runs out" with a tapered portion 640 and flute 300 runs out with a tapered portion 660. Portion 660 is generally symmetrical to portion 640.

Figure 5:
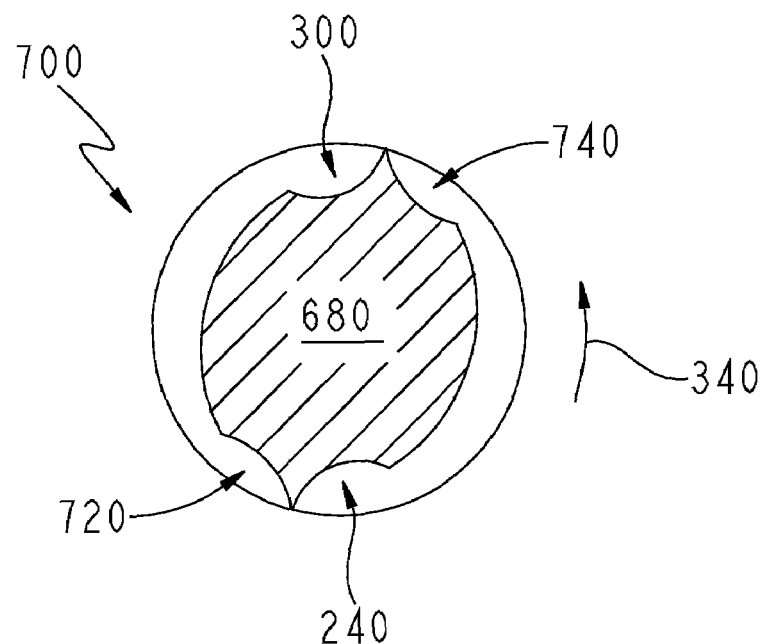
FIG. 5 is a cross-sectional view of a multi-fluted radially sharp portion of an exemplary alternative cutout bit (relative to line 5-5 of FIG. 1)

FIG. 5 is a cross-sectional view of a multi-fluted radially sharp portion 680 of an exemplary alternative cutout bit 700 (relative to line 5-5 of FIG. 1). Bit 700 is configured the same as bit 100 with the exception that throughout portion 680 a generally convex or "hollow grind" facet 720 is added as well as a hollow grind facet 740 as shown in FIG. 5. Facet 720 is generally symmetrical to facet 740.

FIG. 6 is a perspective view of an exemplary operational alignment of exemplary bit 100. As at least partially discernable from FIG. 6, in the exemplary operations a conventional metal electrical outlet or junction box 800 defining a generally rectangular interior opening 820 has been mounted to studding or another wall support (not shown). Further, a drywall panel 840 has been nailed to studding or another wall support (not shown), covering box 800. It is noted that box 800 is merely exemplary and bit 100 may alternatively be used to cut around the inside of a window or door frame or inside and/or around any other suitable structure(s).

In the exemplary operations, a user mounts shank 120 in chuck 140 of a drill, rotary power tool, or other suitable rotational power source (not illustrated in detail). With the power source rotating bit 100 in direction 340, the user cuts an opening 860 through panel 840 corresponding to the shape of box 800. In cutting opening 860, the user first moves tip 200 generally axially along line 880 to drill though panel 840, and then cuts around the periphery of box 800 by moving bit 100 laterally around box 800 with portion 180 (see FIG. 7) substantially abutting and sliding against box 800. A depth gauge may be used with the power source and bit 100 to ensure that portion 180 is inserted to an appropriate depth and that portion 160 (see FIG. 1) remains substantially clear of box 800.

FIG. 7 is a side plan view of exemplary operations of exemplary bit 100. As at least partially discernable from FIG. 7, upon the introduction of tip 200 to panel 840, portion 180 essentially acts like a twist drill bit to axially drill through panel 840 with more efficiency than many designs not having twist-drill bit-like features. Meanwhile, the radial dullness of portion 180 (see also FIG. 2, particularly edge 360) avoids significant damage to box 800 and/or to bit 100 as compared to conventional twist drill bits. Additionally, the tapered run outs (see FIG. 4, particularly portion 640 and portion 660) of flute 240 and flute 300 provide increased shear strength as compared to many designs not having such features, thereby enhancing the integrity of bit 100, especially in smaller diameters.

Bit 700 is used in a like manner to bit 100. The addition of facet 720 and facet 740 (see FIG. 5) to bit 700 may increase its axial drilling efficiency and provide for increased cutting life.

Figure 8:
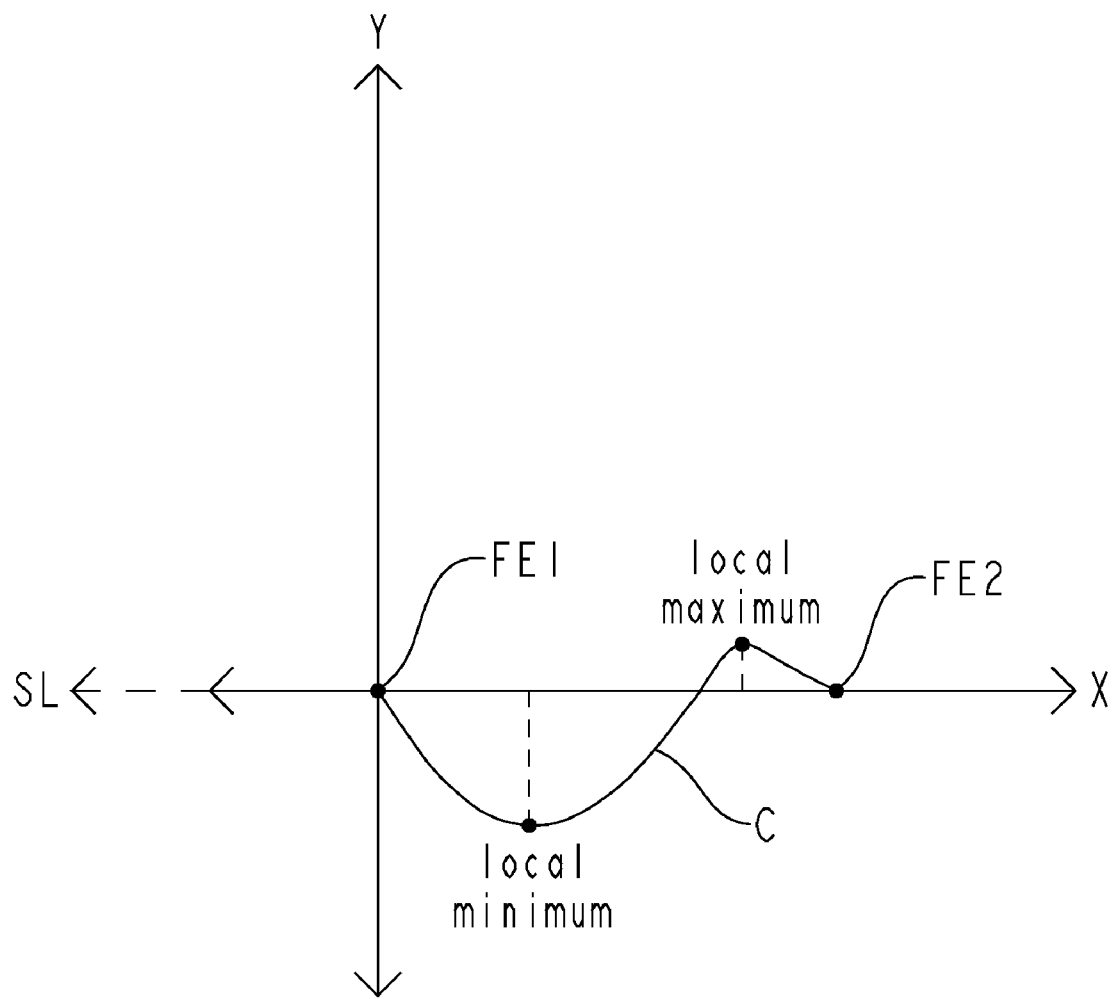
FIG. 8 is an X-Y graph depicting the shape of the curve C that is defined by the flute of the single-fluted radially dull portion of the exemplary bit of FIG. 1 when the bit is viewed cross-sectionally as shown in FIG. 2.

FIG. 8 is an X-Y graph depicting the shape of curve C that is defined by the single flute of the portion 180 of the drill bit 100 when the bit is viewed in a cross sectional view at the portion 180 as shown in FIG. 2. When the drill bit 100 is viewed as such, the drill bit 100 defines a circular shaped bit periphery BP. Also when the drill bit 100 is viewed in the above manner, the single flute of the portion 180 defines a curve C that extends from a first flute end FE1 to a second flute end FE2 as shown in FIGS. 2 and 8. Note that the first flute end FE1 and the second flute end FE2 both lie on the bit periphery BP as shown in FIG. 2. Also note that as shown in FIG. 8, when the curve C is plotted on an X-Y graph in which a straight line SL (see FIG. 2) extending between the first flute end FE1 and the second flute end FE2 defines an X-axis of said X-Y graph, the curve C possesses both (i) a local maximum that is interposed between the first flute end FE1 and the second flute end FE2, and (ii) a local minimum that is interposed between the first flute end FE1 and the second flute end FE2.

Figure 9:
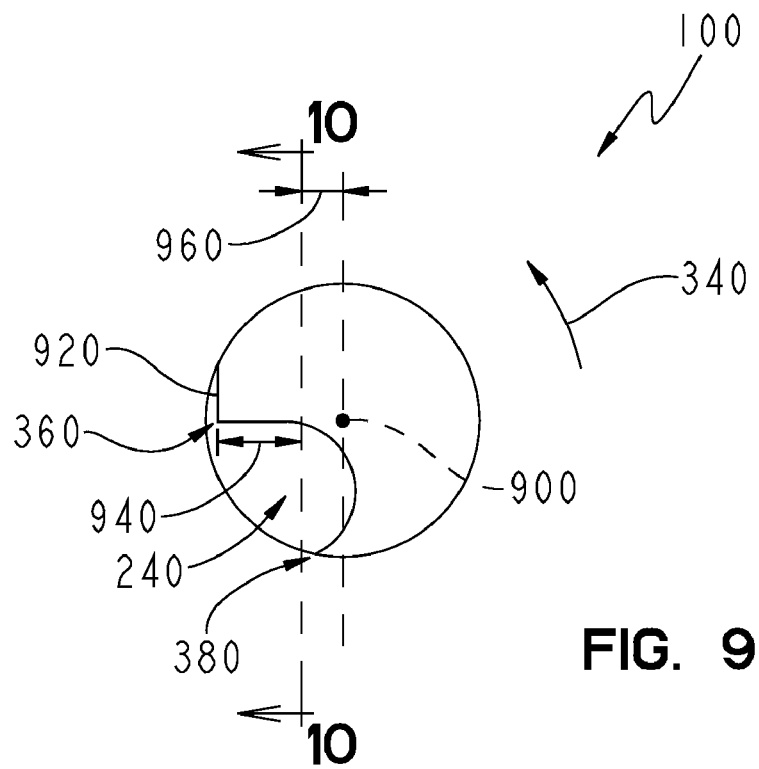
FIG. 9 is a front plan view of the exemplary bit of FIG. 1 (facing the tip)

FIG. 9 is a front plan view of bit 100 (facing tip 200). As at least partially discernable in FIG. 9, bit 100 is configured to be rotated about an axis 900 and edge 360 includes a generally radially outward dulled portion 920 and a sharp portion 940 extending generally radially inwardly from portion 920. Portion 940 is radially offset from axis 900 by a distance 960.

Figure 10:
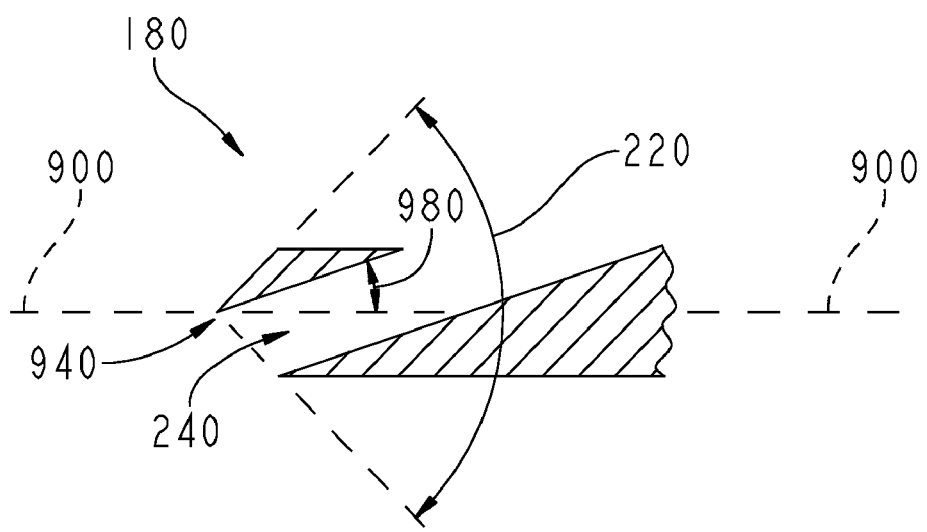
FIG. 10 is a cross-sectional view of the single-fluted radially dull portion of the exemplary bit of FIG. 1 (taken along line 10-10 of FIG. 9)

FIG. 10 is a cross-sectional view of portion 180 of bit 100 (taken along line 10-10 of FIG. 9). As at least partially discernable in FIG. 10, portion 940 of edge 360 (see also FIG. 9) axially opens (or opens into) flute 240 at a positive rake angle 980 of about 30 degrees.

Figure 11:
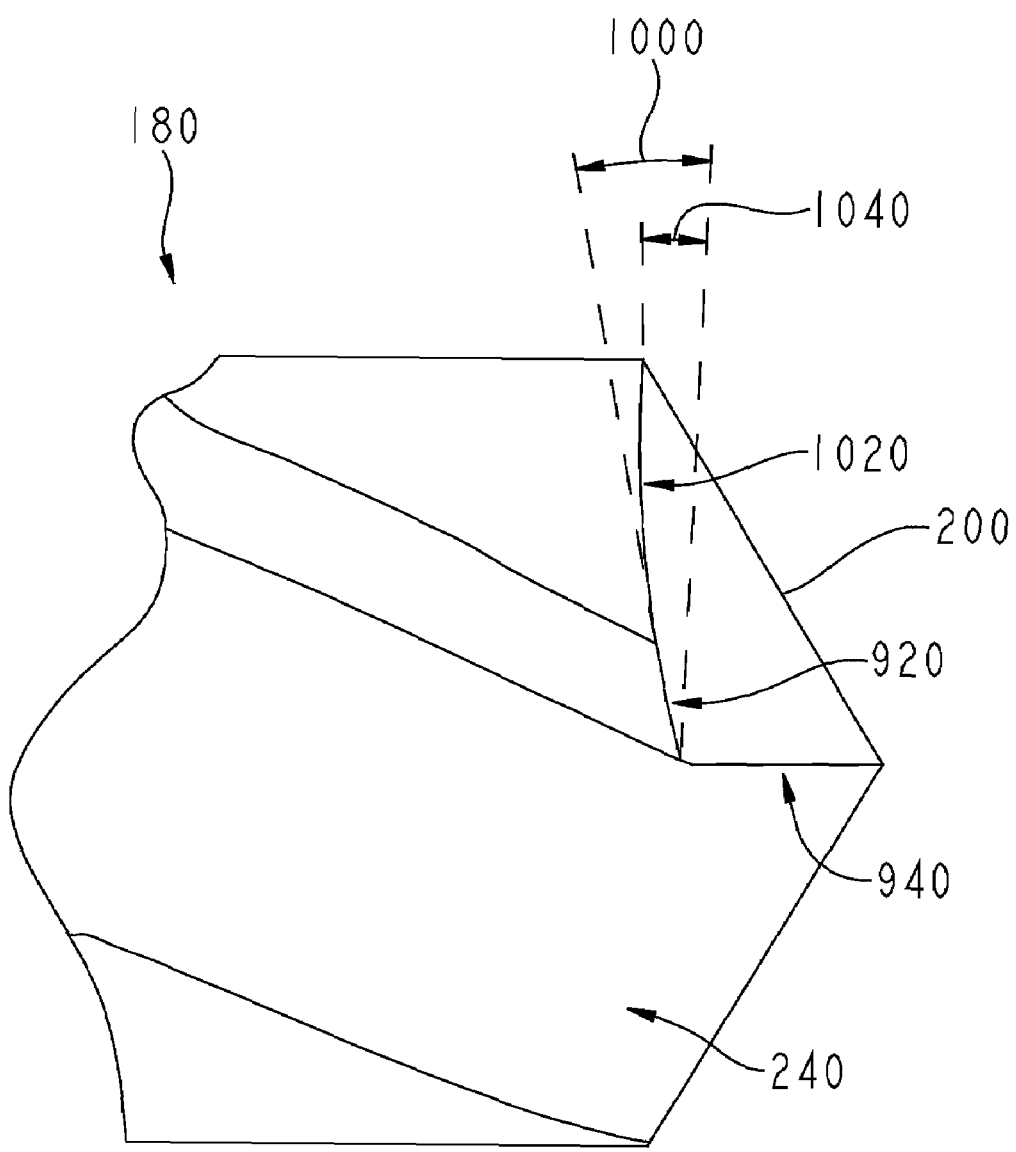
FIG. 11 is a cutaway side plan view of the single-fluted radially dull portion of the exemplary bit of FIG. 1 (proximal to the tip).

FIG. 11 is a cutaway side plan view of portion 180 of bit 100 (proximal to tip 200). As at least partially discernable in FIG. 11, portion 920 (of edge 360; see also FIG. 9) meets tip 200 at a positive axial relief or clearance angle 1000, and portion 180 further includes a tip base edge 1020 that extends from portion 920 and generally radially bounds tip 200. To facilitate production of bit 100, edge 1020 may bound tip 200 with an axial relief or clearance angle 1040 that varies as edge 1020 extends around tip 200.

Although the present invention has been described with respect to certain exemplary embodiments, it will be appreciated by those of skill in the art that other implementations and adaptations are possible. Moreover, there are advantages to individual advancements described herein that may be obtained without incorporating other aspects described above. Therefore, the spirit and scope of the appended claims should not be limited to the description of the exemplary embodiments contained herein.

What is claimed is:

1. A cutout bit, comprising:
a first bit segment configured to be received in a chuck of a rotary power tool, said first bit segment being free of flutes;
a second bit segment having defined therein a plurality of flutes that extend helically along said second bit segment; and
a third bit segment having only a single flute defined therein, said single flute (i) extending helically along said third bit segment, and (ii) being aligned with one of said plurality of flutes defined in said second bit segment, wherein said third bit segment possesses a first end portion that defines a distal end of said cutout bit.

2. The cutout bit of claim 1, wherein said first end portion is configured to be conically-shaped.

3. The cutout bit of claim 1, wherein said first bit segment possesses a second end portion that defines a proximal end of said cutout bit.

4. A cutout bit, comprising;
a first bit segment configured to be received in a chuck of a rotary power tool, said first bit segment being free of flutes;
a second bit segment having defined therein a plurality of flutes that extend helically along said second bit segment; and
a third bit segment having only a single flute defined therein, said single flute (i) extending helically along said third bit segment, and (ii) being aligned with one of said plurality of flutes defined in said second bit segment,
wherein: when said cutout bit is viewed in a cross sectional view at said third bit segment, (i) said cutout bit defines a circular shaped bit periphery, and (ii) said single flute defined in said third bit segment defines a curve extending from a first flute end to a second flute end,
said first flute end and said second flute end both lie on said bit periphery, and
when said curve is plotted on an X-Y graph in which a straight line extending between said first flute end and said second flute end defines an X-axis of said X-Y graph, said curve possesses both (i) a local maximum that is interposed between said first flute end and said second flute end, and (ii) a local minimum that is interposed between said first flute end and said second flute end.

5. The cutout bit of claim 1, wherein said second bit segment possesses exactly two flutes defined therein.

6. A cutout bit, comprising:
a first bit segment configured to be free of flutes;
a second bit segment extending from said first bit segment at a first location;
a third bit segment extending from said second bit segment and terminating in a tip;
a first flute extending along only said second bit segment; and
a second flute extending along both said second bit segment and said third bit segment,
wherein said second flute extends from said first location to said tip.

7. The cutout bit of claim 6, wherein said third bit segment includes a conical-shaped end portion that defines said tip.

8. The cutout bit of claim 6, wherein said first bit segment defines a proximal end of said cutout bit.

9. The cutout bit of claim 6, wherein:
when said cutout bit is viewed in a cross sectional view at said third bit segment, (i) said cutout bit defines a circular shaped bit periphery, and (ii) said second flute defined in said third bit segment defines a curve extending from a first flute end to a second flute end,
said first flute end and said second flute end both lie on said bit periphery, and
when said curve is plotted on an X-Y graph in which a straight line extending between said first flute end and said second flute end defines an X-axis of said X-Y graph, said curve possesses both (i) a local maximum that is interposed between said first flute end and said second flute end, and (ii) a local minimum that is interposed between said first flute end and said second flute end.

10. The cutout bit of claim 6, wherein:
exactly two flutes extend along said second bit segment, and
exactly one flute extends along said third bit segment.

* * * * *